(12) United States Patent
Schiller et al.

(10) Patent No.: US 11,512,999 B1
(45) Date of Patent: Nov. 29, 2022

(54) BARGE GAUGING WITH LIDAR FOR DETERMINING THE POSITION OF A BARGE SURFACE AND THE POSITION OF A WATER SURFACE

(71) Applicant: Mazzella Lifting Technologies, Inc., Cleveland, OH (US)

(72) Inventors: Tom D. Schiller, Nashville, TN (US); Frederic Katz, Greensboro, NC (US); Daniel Kent, Sanford, FL (US)

(73) Assignee: Mazzella Lifting Technologies, Inc., Cincinnati, OH (US)

( * ) Notice: Subject to any disclaimer, the term of this patent is extended or adjusted under 35 U.S.C. 154(b) by 863 days.

(21) Appl. No.: 16/417,591

(22) Filed: May 20, 2019

Related U.S. Application Data

(60) Provisional application No. 62/674,005, filed on May 20, 2018.

(51) Int. Cl.
| | |
|---|---|
| *G02B 21/00* | (2006.01) |
| *G01G 9/00* | (2006.01) |
| *G01S 17/88* | (2006.01) |
| *G01S 17/42* | (2006.01) |
| *G01G 19/00* | (2006.01) |
| *G01F 23/284* | (2006.01) |
| *G01F 23/292* | (2006.01) |

(52) U.S. Cl.
CPC ............. *G01G 9/00* (2013.01); *G01G 19/00* (2013.01); *G01S 17/42* (2013.01); *G01S 17/88* (2013.01); *G01F 23/284* (2013.01); *G01F 23/292* (2013.01)

(58) Field of Classification Search
CPC ......... B63B 39/12; B63B 79/40; B63B 27/00; B63B 25/00; B63B 35/00; B63B 35/28; G01V 3/15; G01B 21/00; G01B 21/18; G01B 21/16; G01B 11/22
USPC ............................................... 250/221, 214.1
See application file for complete search history.

(56) References Cited

U.S. PATENT DOCUMENTS 7,688,348 B2 * 3/2010 Lubard ................... G01S 17/93
356/28.5

* cited by examiner

*Primary Examiner* — Que Tan Le
(74) *Attorney, Agent, or Firm* — Waller Lansden Dortch & Davis LLP; Matthew C. Cox

(57) ABSTRACT

A draft survey apparatus for gauging a barge by determining a weight of bulk materials loaded and discharged from the barge in water wherein the water level is provided. The draft survey apparatus includes a light source for emitting photons radially outward from the light source, a receiver for receiving the photons reflected off of the barge and surface, the receiver operable to sense a return angle of the photons, and a processor operable to determine a position of the objects and surfaces in three dimensional space based on the return angle of the photons and a time delay of photons between emission and receipt. The processor is operable to determine the weight of the bulk materials on the barge based on a height of barge above the water level.

20 Claims, 9 Drawing Sheets

BARGE GAUGING WITH LIDAR FOR DETERMINING THE POSITION OF A BARGE SURFACE AND THE POSITION OF A WATER SURFACE

CROSS-REFERENCES TO RELATED APPLICATIONS

This application is a non-provisional of U.S. Patent Application No. 62/674,005 filed May 20, 2018 entitled BARGE GAUGING WITH LIDAR, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to barge gauging and surveying. A draft survey or gauging a barge is a process of determining the depth of the barge or barge riding beneath the surface of the water, generally due to bulk materials being loaded and carried by the barge. Specifically, the draft of a barge's hull is the vertical distance between the waterline and the bottom of the hull or the keel. Obtaining the draft of the barge can serve two purposes. First, draft can allow a crew to ascertain when a predetermined mass of bulk materials have been loaded onto the barge and, second, can allow for a crew to determine the navigable waters with respect to the barge, such that the hull of the barge will not contact any solid surfaces such as riverbeds or lake beds while navigating the waters.

Gauging or surveying can be used to determine the weight of bulk materials loaded and discharged from a barge. This is accomplished by determining the draft of the barge with and without the materials carried by the barge. By determining the difference in the draft of the barge before and after the loading or unloading of materials from the barge, the weight of the materials can be calculated by determining the difference of the volume of water displaced by the barge with and without the load, which can be used to calculate the mass of the water displaced which is equal to the mass or weight of the cargo.

The draft of a barge also is related to the stability of a ship in the water. The stability of a barge can be determined by the center of gravity of the barge with respect to the metacenter of the hull (or the point about which the barge oscillates during angular displacement). Placement of a load on the barge can affect the stability of the ship by affecting the center of gravity of the ship with relation to the metacenter.

Traditionally, barges are gauged or undergo a draft survey using manual techniques. This process requires personnel to embark on the barge to measure the barge's draft. Personnel are often required to precariously position themselves to obtain the proper measurements for determining accurate values for a barge's draft. This requires personnel to determine the draft from at least six positions on the barge including the forward portside and starboard side, mid-ship portside and starboard side, and aft portside and starboard side. Because these measurements should be very accurate, it can require the personnel to be positioned outside of the safety of the deck of the barge, which can be dangerous in certain conditions such as poor weather conditions or high traffic conditions. Even in good weather conditions, mishaps can occur including falling from the barge or land into the water or being pinned or crushed between the barge and the dock. The barges are very large and the fall to the water can be significant and dangerous and if pinned between the barge and land, and the barge is too massive to move by hand. When weather conditions are bad, it can become an even greater danger to the personnel as icy conditions can cause slipping during transfer between land and the barge or while taking the measurements. When the conditions are icy, personnel can quickly experience hypothermia or even death if they fall into the icy waters.

Not only can the measurement by dangerous to the personnel, but the measurements can be time consuming, inaccurate, and are static measurements (meaning real-time measurements are not possible) which each lead to inefficiencies in the loading and unloading of barges. Taking the measurements at multiple points on a boat can require multiple personnel to take the measurements or can take a long period of time when considering the time constraints for loading or unloading a bulk load from a barge. This can become even more difficult when trying to gauge the barge for weight and distribution simultaneously as the readings need to be made constantly from multiple positions on the barge.

What is needed then are systems and methods for gauging or surveying a barge's draft more safely, accurately, and in real-time.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a draft survey apparatus for gauging barges by determining a weight of bulk materials loaded and discharged from the barge. The draft survey apparatus can include a light source for emitting photons radially outward from the light source, a receiver for receiving the photons reflected off of objects and surfaces, the receiver operable to sense a return angle of the photons, and a processor operable to determine position of the objects and surfaces in three dimensional space based on the return angle of the photons and a time delay of photons between emission and receipt, wherein the processor is operable to determine the weight of the bulk materials on the barge based on the position of objects and surfaces relative to the light source and receiver.

Another aspect of the disclosure includes a method for gauging barges by determining a weight of bulk materials loaded and discharged from the barge. The method can include emitting photons from a light source radially outward from the light source, receiving, by a receiver, the photons reflected off of objects and surfaces, wherein the receiver is operable to sense a return angle of the photons, and determining by a processor, a position of the objects and surfaces in three dimensional space based on the return angle of the photons and a time delay of photons between emission and receipt, wherein the processor is operable to determine the weight of the bulk materials on the barge based on the position of objects and surfaces relative to the light source and receiver.

Numerous other objects, advantages and features of the present disclosure will be readily apparent to those of skill in the art upon a review of the following drawings and description of a preferred embodiment.

DETAILED DESCRIPTION

Figure 1:
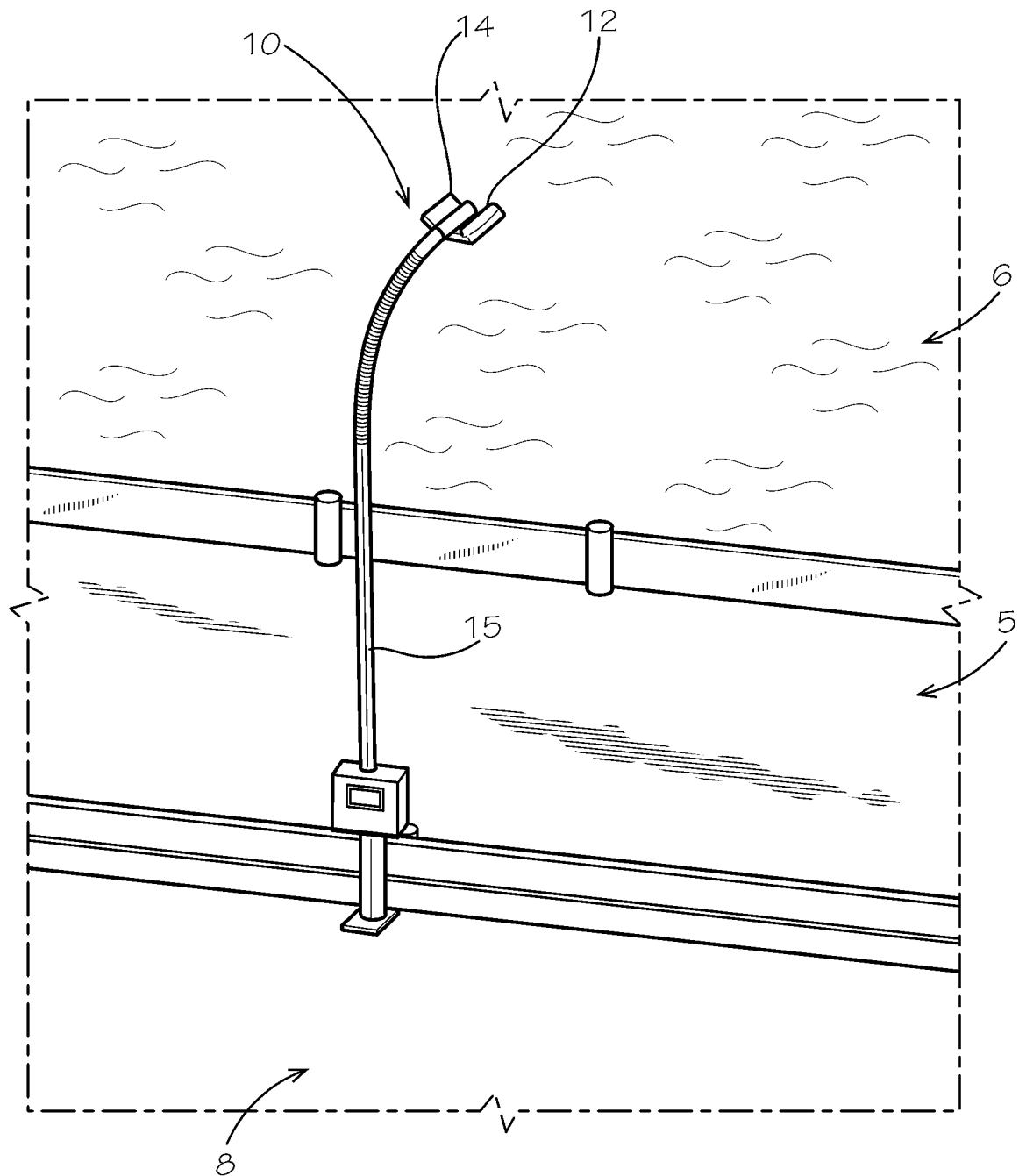
FIG. 1 is an exemplary embodiment of an integrated draft survey apparatus mounted on land.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Referring to the figures of the application, FIG. 1 provides an exemplary embodiment of a draft survey apparatus 10 for gauging barges. The draft survey apparatus 10 may be mounted to land 8. A barge 5 may be docked near the land 8 proximate the draft survey apparatus 10. The draft survey apparatus 10 may be operable to determine the draft of a barge 10 when the barge 10 is located proximate the draft survey apparatus 10 as will be disclosed in more detail herein. Furthermore, the draft survey apparatus may provide real-time determination of the draft of the barge 5.

The draft survey apparatus 10 can include a light source 12, a receiver 14, and a processor 16. The light source 12 can be operable to emit photons 13 from the light source 12. The receiver 14 can be operable to receive or detect the photons 13 which have reflected off of a surface or object, for example, the surface of water (water surface 6), the bed 9 of a river or lake, or the barge 5. The processor 16 can be operable to determine a position of the object or surface based on data received from the receiver 14 or the light source 12 and the receiver 14. The draft survey apparatus 10 may further include a pole 15 to which the various elements, including the light source 12 and the receiver 14, are mounted. The pole 15 includes a first end and a second end and can position the various components, such as the light source 12 and the receiver 14, such that the draft survey apparatus 10 is operable to receive measurements of positions of a barge 5 relative to the surface 6 of the water. Where the hull of the barge 5 and the surface of the water coincide is the water line 7. In some embodiments the light source 12 and the receiver 14 are positioned on the first end of the pole 15.

The light source 12 may emit photons 13 or pulsed laser light. The photons 13 may be emitted at specific wavelengths, including ultraviolet, visible, or near infrared light. The photons 13 may also be emitted from the light source 12 in multiband. The light source can emit the photons 13 in pulses which may be determined by a laser, a laser cavity, or manually set. The light source 12 may include various types of technologies for emitting photons 13, including gas lasers, chemical lasers, dye lasers, metal-vapor lasers, solid-state lasers, semiconductor lasers, light-emitting diodes, and any other technology known to one of skill in the art.

The receiver 14 may comprise scanners, optics, photodetectors, and receiver electronics. The scanners and optics can include dual oscillating plane mirrors, polygon mirrors, dual axis scanner, hole mirrors, beam splitters, and any other scanners and optics known to one of skill in the art. Photodetectors and receiver electronics include solid state photo detectors, silicon avalanche photodiodes, photomultipliers, and any other photodetectors and receiver electronics known to one of skill in the art. The use of light sources 12 and receivers 14 can also refer to LiDAR. The draft survey apparatus 10 leverages the high resolution, non-contact nature of LiDAR to determine the draft of a barge 5.

In some embodiments, as the light source 12 and the receiver 14 generate data relating to the time of emission and receipt of the photon 13, data may be sent to a processor 16 to determine the distance of the surface or object from the light source 12 and the receiver 14. In some embodiments the light source 12 and the receiver 14 may be positioned at a predetermined distance apart and in others they may positioned proximate one another. In some embodiments, the light source 12 and the receiver 14 are housed in a single housing. In either embodiment, the processor 16 may include computer-readable instructions to be executed by the processor which instruct the processor 16 to account for the position of the light source 12 relative to the receiver 14 when determining the distance the photons 13 travelled.

With further reference to FIG. 1, the draft survey apparatus 10 may include a user interface 18. The user interface 18 may be operable to display the data received and processed by the processor 16. In some embodiments, the user interface 18 receives instructions from the processor 16 to display certain information. The information that is displayed may include the distance the photon 13 travelled from the light source 12 to the receiver 14. Other information that may be displayed on the user interface 18, may include the topographic maps or three dimensional maps of the surrounding area, draft of the barge 5, distance to surface 6 of water from light source 12, receiver 14, and/or any predefined position or point on the barge 5, the yaw, pitch and roll of the barge 5, weight of loaded and discharged bulk materials, operational capability of the various components, network connections, instructions, commands, menus, and any other information that useful as known to one of skill in the art. Thus user may have dynamic updates or real-time information regarding the draft of a barge 5. Specifically, the draft may be determined in real-time during the loading or unloading of bulk material from the barge 5.

With further reference to the real-time determination of the draft of a barge 5, the draft survey apparatus 10 may be operable to calculate the draft of a barge such that the results of any loading and discharging of bulk materials may be continuously monitored. For example, the light source 12 may regularly emit photons 13 during the operation of the draft survey apparatus 10. For example, photons 13 may be regularly emitted in nanosecond intervals. In other embodiments the photons may be emitted in millisecond, fraction of a second, second, 2-second, 3-second, 5-second, 10-second, 30-second, 1-minute, 2-minute, or 5-minute intervals. However, these disclosed intervals are not to be construed as limiting and are merely provided as example. As the draft survey apparatus 10 emits and receives the photons, the processor 16 continuously determines the weight of bulk materials loaded on and discharged from the barge 5, the yaw, pitch, and roll of the barge, the relative position of the barge surface and the water surface 6, and any other determination disclosed herein.

In some embodiments, the user interface 18 may also instruct the processor 16 as to which functions are to be performed with the data. For example, the user interface 18 may also be operable to permit a user to select various modes of operation including a manual or automated operation mode or to display certain information relating to the operation of the draft survey apparatus 10, including a history of previous barges or arrangements of graphical information such as charts, numbers, and 3D mapping. Thus, in some embodiments, the user interface 18 may comprise both input and output functions.

In some embodiments, when a user selects, via a user interface 18, a specific parameter of information that is to be determined by the processor 16 and displayed on the user interface 18, the processor 16 may require supplemental data to complete the determination or function. In order to determine and produce some of this information, the processor 16 may receive from a database 17 data that is necessary to complete those calculations. For example, the database 17 may include data representing the depth of the hull, length of the barge 5, a three dimensional map or model of the barge 5, the position of the light source 12 and receiver 14 relative to the ground 8, and other information that would be relevant to each determination as known to one of skill in the art.

Referring further to FIG. 1, the user interface 18 may be mounted directly to a pole 15. This provides an integrated data acquisition draft survey apparatus 10, wherein each of the components of the draft survey apparatus 10 are mounted or contained on a single unit. In some embodiments, the pole 15 is mounted directly to land 8 or the dock. Thus, in this embodiment, the draft survey apparatus 10 has a static position on the dock and the barge 5 and the water surface 6 move relative to the static position of the draft survey apparatus 10.

Figure 2:
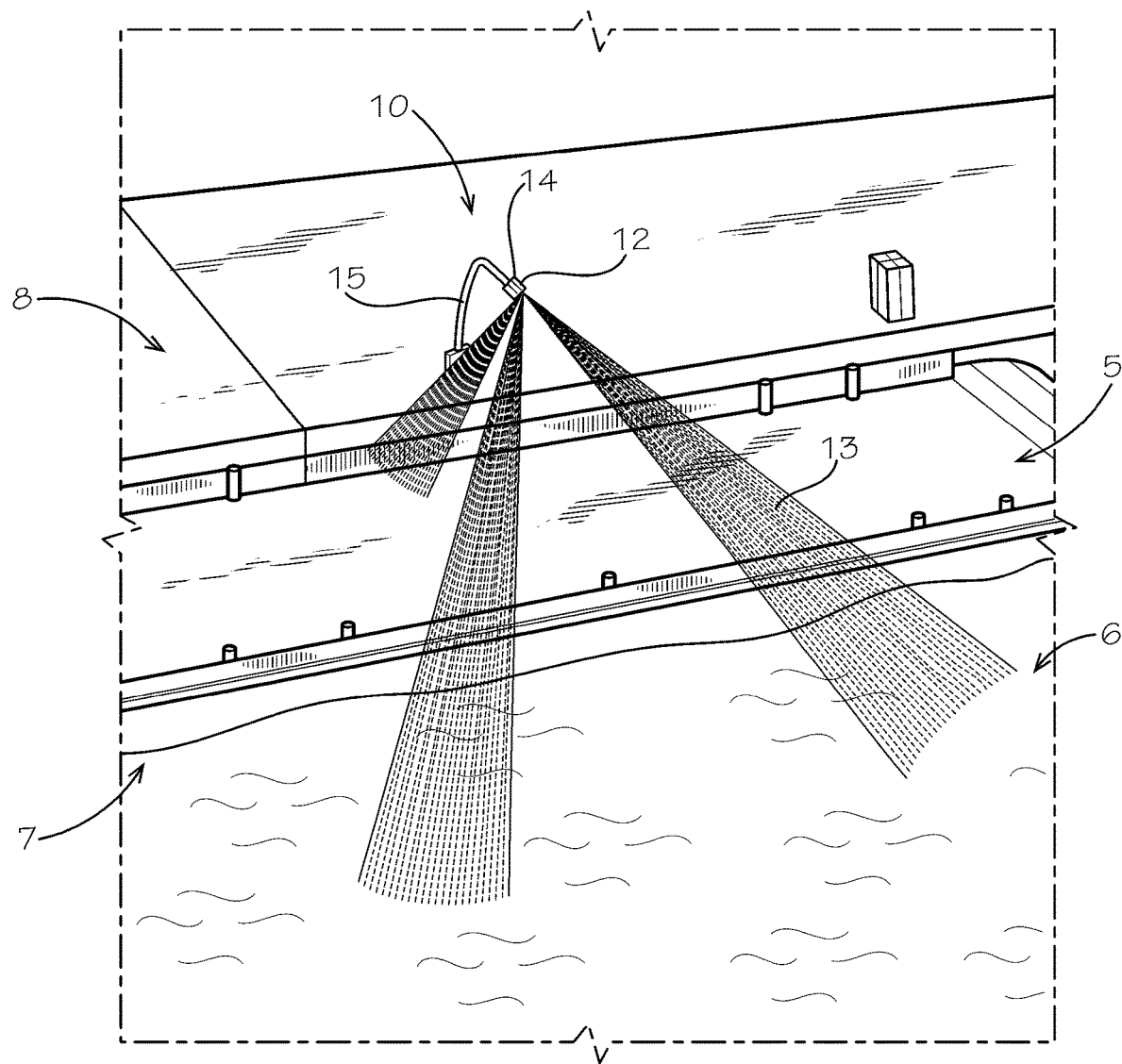
FIG. 2 is an exemplary embodiment of a draft survey apparatus measuring the water surface of relative to the barge.

Referring now to FIG. 2, the light source 12 and the receiver 14 of the draft survey apparatus 10 may be mounted at a vertically elevated position relative to the barge 5. The light source 12 and the receiver 14 may be mounted on a pole 15, or in other embodiments not shown, the various components may be mounted directly on other objects, such as crane towers, surrounding buildings, trees, railings, or any other object known to one of skill in the art for positioning the components of the of the draft survey apparatus 10 in an optimal position for sending and receiving photons 13 in the LiDAR application.

Figure 3:
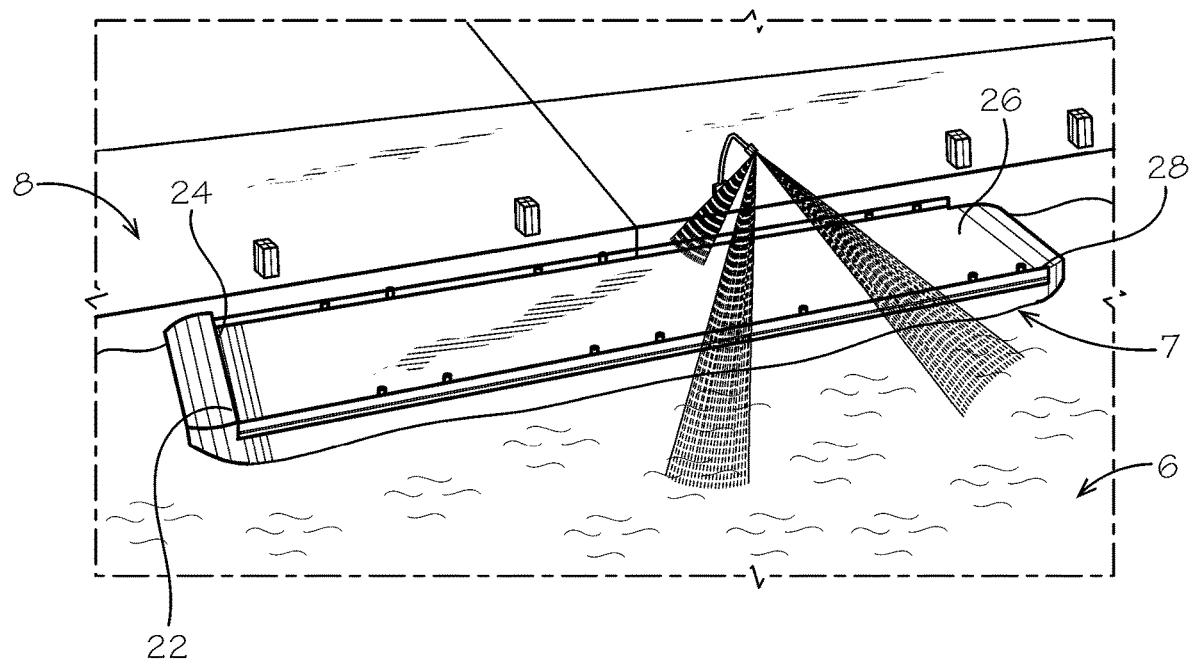
FIG. 3 is an exemplary embodiment of a draft survey apparatus measuring four points on a rigid-body barge for determining the draft of the barge.

As demonstrated in FIG. 2, the light source 12 may be mounted at a vertically elevated position such that the light source 12 is operable to emit photons 13 in a wide plane. The photons 13 are emitted from the light source 12 and travel radially outward from the light source 12. The photons 13 then reflect off of the surface, in one embodiment the water surface 6, and return and are received by the receiver 14. The draft survey apparatus 10 may be operable to determine the draft of the barge 5 based on the traditional six points on the barge 5, including the forward portside and starboard side, mid-ship portside and starboard side, and aft portside and starboard side. The draft survey apparatus 10 may also be operable to determine a more comprehensive draft of the barge 5 by surveying a greater number of points than the traditional six points, by using 3D point cloud data produced by the draft survey apparatus 10. In yet another embodiment, the draft survey apparatus 10 is configured to determine the draft of the barge 5 at four points, namely Point A 22, Point B 24, Point C 26, and Point D 28, as shown in FIG. 3. The draft survey apparatus 10 is able to determine an accurate draft of the barge 5 based on Point A 22, Point B 24, Point C 26, and Point D 28 because of the rigid-body kinematics of the barge 5. The draft survey apparatus 10 may monitor the pitch, yaw, and roll of the barge 5. In each embodiment 3D point cloud data may be utilized to generate a three dimensional model of the barge 5 and water surface 6.

Figure 4:
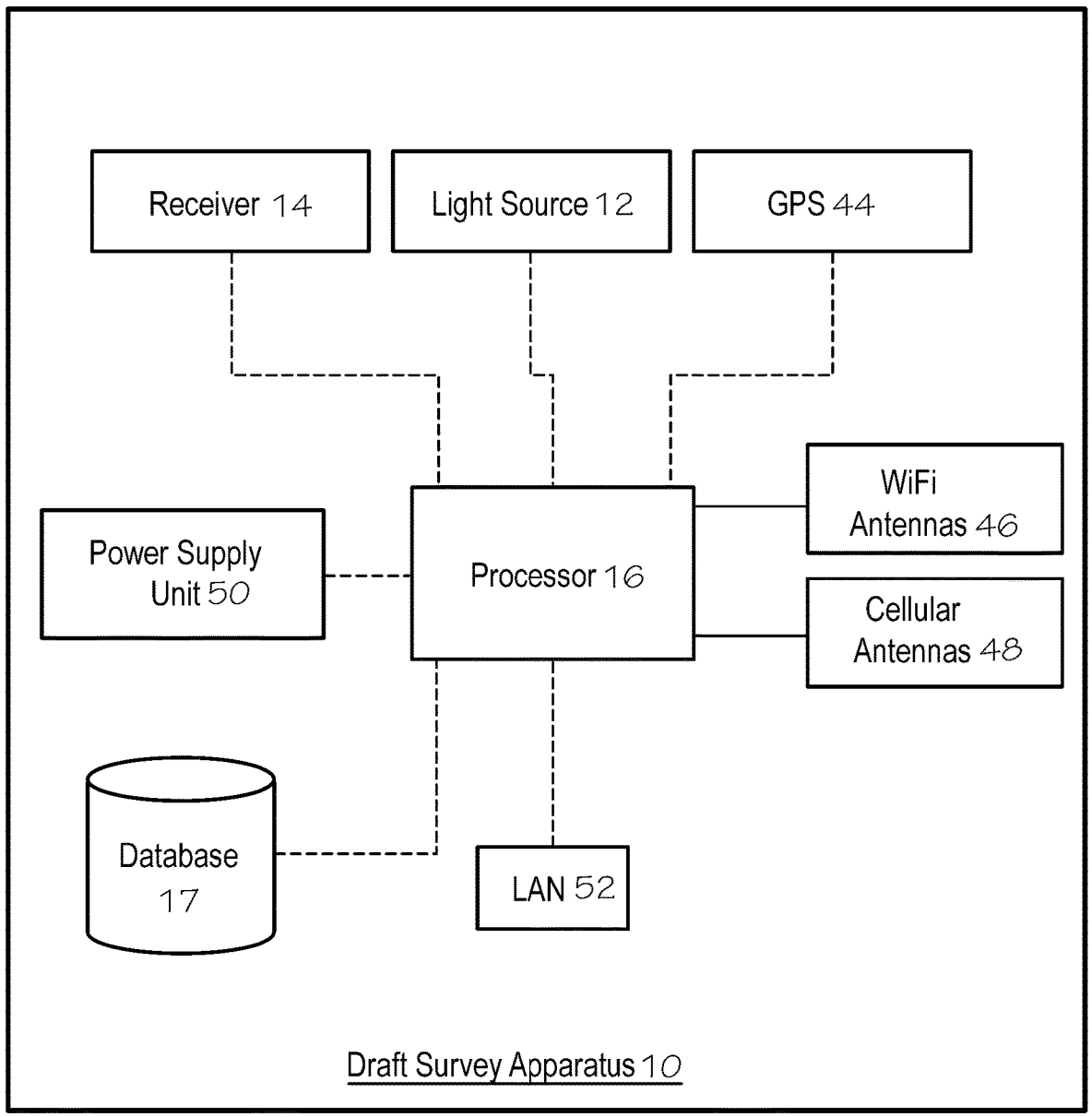
FIG. 4 is an exemplary schematic of a draft survey apparatus.

Now referring to FIG. 4, an exemplary embodiment of the draft survey apparatus 10 may include the depicted components. For example, the draft survey apparatus 10 may include a processor 16. As discussed the processor 16 is operable to instruct the various components of the draft survey apparatus 10 to perform the appropriate functions; to receive data from the various components; to calculate various results based on the received data such as draft, pitch, roll, and yaw of a barge, weight of a load on a barge, etc.; and to send the calculated results and data to a user interface 18 for communication of the calculated results to a user. The processor 16 may be electronically coupled, either directly or indirectly, to the LiDAR components (e.g., light source 12 and receiver 14), a GPS 44, WiFi antennas 46, cellular or LTE antennas 48, and a power supply 50. In some embodiments, the processor 16 may also be electronically coupled to LAN Ethernet 52.

An example of the operation of the processor 16 will be provided. The processor 16 may send an instruction to the light source 12 to emit photons 13. The processor 16 may send the instruction and note the time at which the instruction was sent. Likewise, the light source 12 may note the time at which the instruction was received or when the light source 12 emitted the photon 13. In one exemplary embodiment, the light source 12 records a time at which the photon 13 was emitted. The receiver 14 may receive an instruction to be in an active state or configuration for receiving photon 13. In other embodiments, the receiver 14 is constantly in an active state for receiving photon 13. The receiver 14 may be configured to only receive specific photons 13 or light waves based on certain parameters (e.g., frequency, amplitude, etc.). In other embodiments, the receiver 14 may receive a range of various light waves, wherein the processor 16 is operable to determine the emitted photon 13 that reflected off of a surface and was received by the receiver 14. The receiver 14 or the processor 16 may be operable to determine and record a time at which the photon 13 was received. The processor 16 is then operable to determine the distance from the light source 12 and the receiver 14 are from the surface that reflected the photon 13.

Referring still to FIG. 4, the processor 16 may communicate with other devices via various methods and components, including WiFi, cellular communication, and wired communication such as LAN GbE. The processor 16 may wirelessly send and receive data via the WiFi antennas 46 and the LTE antennas 48. Such communications may include operating instructions, recorded data, inputs for use in calculations, data sent and received from databases, or any other communications as readily available to one of skill in the art. For example, the processor 16 may communicate with a user interface 18 via WiFi connection. In other embodiments, the processor 16 may communicate with the user interface 18 via a cellular network by employing a cloud network. In still further embodiments, the processor 16 may communicate with the user interface 18 via a wired LAN connection 52. Although the preceding examples have been provided for communication networks, the embodiments disclosed herein are not limited to the specific combinations of components and connections provided herein, but one of skill in the art will recognize instances in which a specific connection type and components providing the connection may be substituted for various other components and connections. For example, the processor 16 may be connected via a LAN connection to a second draft survey apparatus 10b, wherein the first and second draft survey apparatuses are able to coordinate information to be used in surveying a single or multiple barges. See FIG. 8.

Referring again to NEW FIG. 4, a power supply unit 50 may be provided for supplying power to the processor 16. In some embodiments, the power supply unit 50 may likewise be operable to provide power to the remaining components of the draft survey apparatus 10, for example, the LiDAR components such as the light source 12 and the receiver 14, the GPS 44, and the user interface 18.

Figure 5:
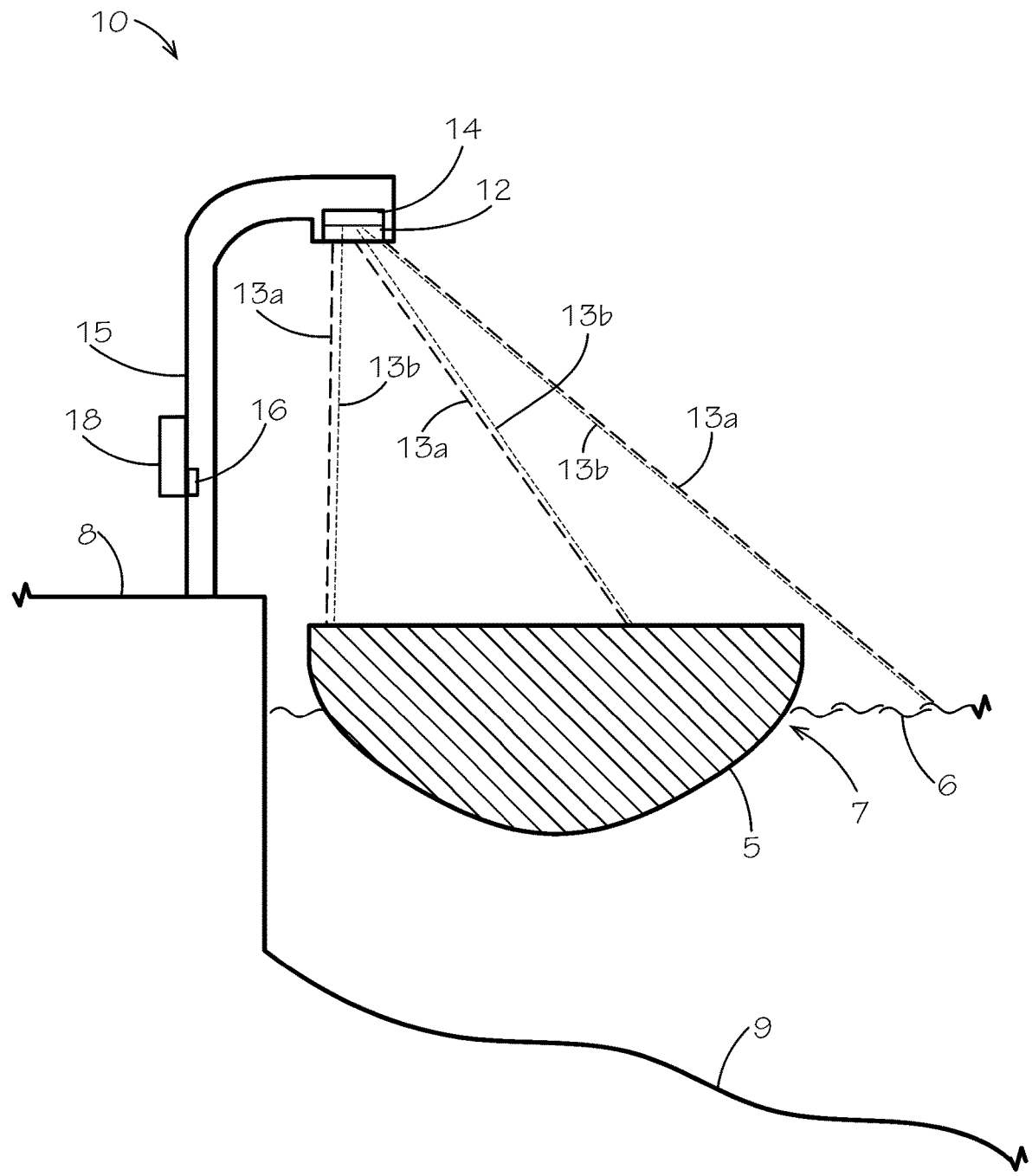
FIG. 5 is a cross section of a barge and a draft survey apparatus, wherein the draft survey apparatus is emitting photons and receiving reflected photons.

FIG. 5 provides an exemplary embodiment of the draft survey apparatus 10 mounted to land 8. In this embodiment, the draft survey apparatus 10 may emit photons 13 from the light source 12. The emitted photons 13a travel through space until they contact either the barge 5 or the water surface 6. Once the emitted photons 13a contact the barge 5 or the water surface 6, they are reflected. The reflected photons 13b then travel back to the receiver 14 which is configured to receive the reflected photons 13b. The delay in time in the various photons 13 in returning after reflection from a surface to the receiver 14 can be used to determine the distance travelled by the photons. In some embodiments the light source 12 and the receiver 14 are operable to produce timing information representative of the time that a photon 13 was emitted and receiver. The timing information is sent to the processor 16 which is operable to determine the distance the photons 13 travelled.

In some embodiments, the processor 16 may be operable to determine the distance between the barge 5 and the water surface 6. Furthermore, the processor 16 may be operable to determine an average water surface 6 level because the water surface 6 is not level or flat. The receiver 14 may further be operable to detect the angle at which the photon 13 is received, thus allowing the processor to determine the direction and distance the photon 13 travelled, which allows the processor to determine a three dimensional map of the surfaces from which the photons are reflected.

As can further be seen in FIG. 5, the user interface 18 may be coupled directly to the pole 15. The user interface 18 and processor 16 may be electrically coupled to the light source 12 and the receiver 14. In alternate embodiments, the processor 16 and/or user interface 18 may be remote from the light source 12 and the receiver 14 via a transceiver 11 as demonstrated in FIG. 6. This can be accomplished via a variety of connections known to one of skill in the art, including Wi-Fi, Bluetooth, cellular communication, satellite, cloud servers, etc. Remote access to the light source 12 and the receiver 14 can allow a user to both operate the draft survey apparatus 10 manually or user may remotely access the information which the draft survey apparatus 10 is operable to retrieve and determine. Because the user interface 18 may be remote from the light source 12 and the receiver 14, a user may be able to view and determine the draft of a barge 5 when the user is not physically present at the site of the measurement.

In other embodiments, the user interface 18 may allow for a secondary set of equipment such as a bulk materials transporter to be controlled based on the information being determined by the draft survey apparatus 10. For example, when loading a barge with a bulk materials, such as coal, the user interface 18 may be operable to receive a predetermined mass which can be loaded onto the barge 5. When a conveyor or other means has loaded the predetermined mass of bulk materials onto the barge 5, the draft survey apparatus 10 may automatically terminate the operation of the means for loading the bulk materials onto the barge 5, such as terminating the rolling motion of a conveyor. However, the information used need not be limited to merely the weight of the materials. For example, any number of predetermined changes or predefined parameters may be used including weight of bulk materials, change in draft, change in pitch, roll, or yaw of the barge 5, uneven distribution of bulk materials based on the relative location of the plurality of points 22, 24, 26, 28 relative to the water surface, and any other metric readily known by one of skill in the art.

In other embodiments, the draft survey apparatus 10 may continually monitor the distribution of a bulk material being loaded or unloaded from a barge 5. The draft survey apparatus 10, via the user interface 18, may provide suggestion as to weight distribution of the bulk materials on the deck of the barge 5. In other embodiments, the draft survey apparatus 10 may be integrated such that the draft survey apparatus 10 may be operable to control the machinery which loads the bulk materials onto the barge 5, such that the draft survey apparatus 10 automatically distributes the bulk material appropriately on the barge 5.

Figure 6:
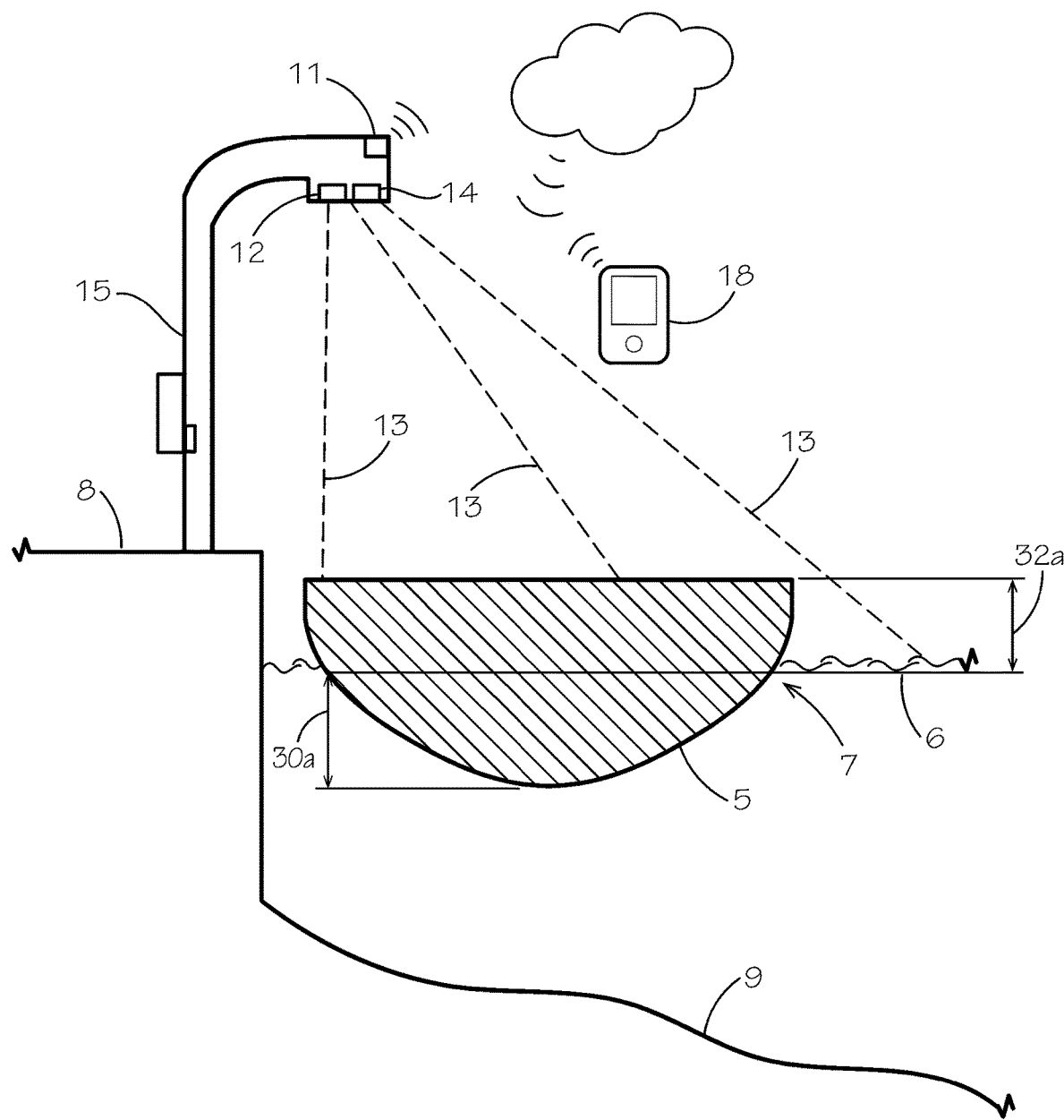
FIG. 6 is a cross section of a barge and a draft survey apparatus, wherein the draft survey apparatus comprises a remote user interface and wherein the draft survey apparatus is determining the draft of an unloaded barge.
Figure 7:
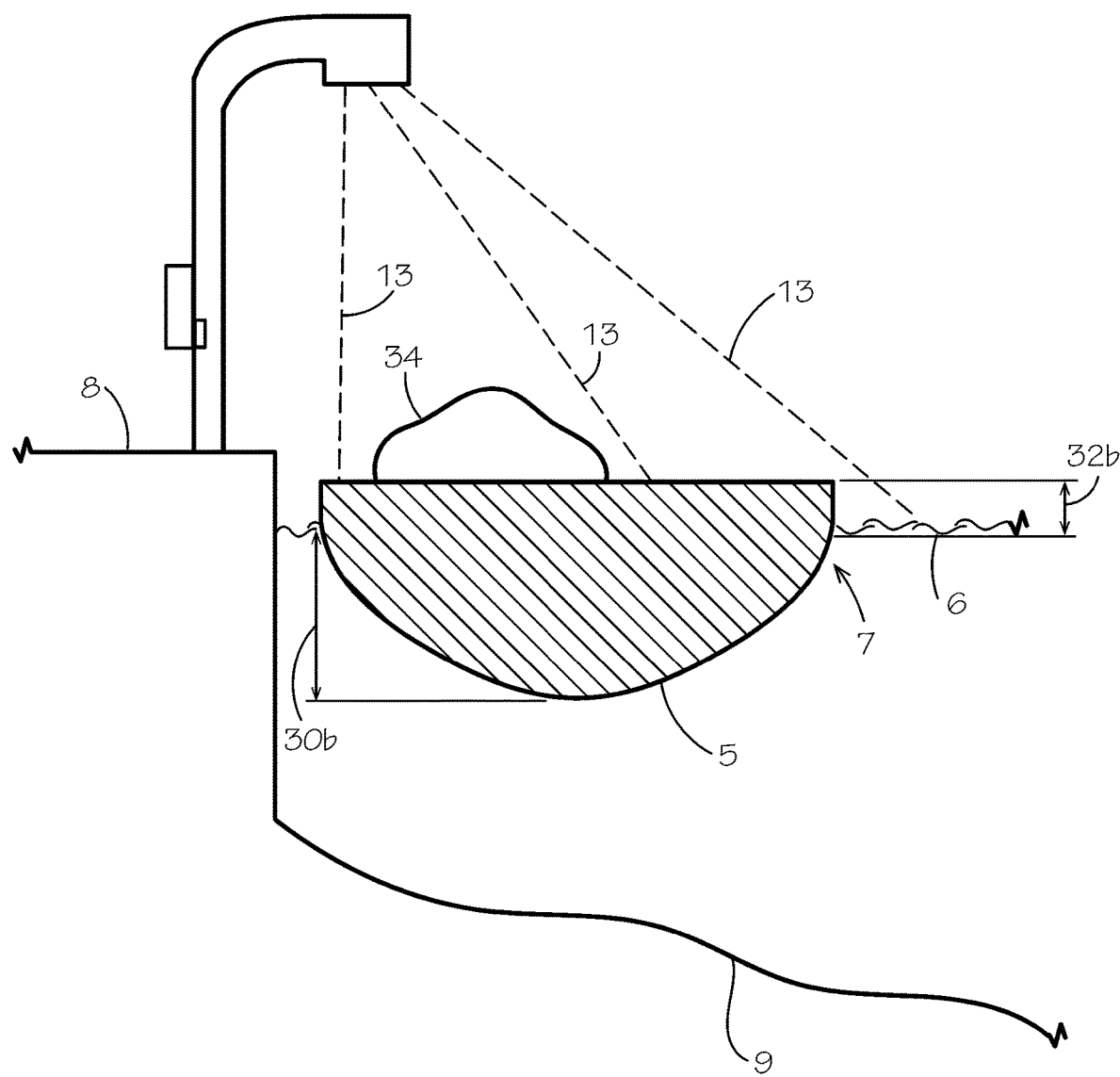
FIG. 7 is a cross section of a barge and a draft survey apparatus, wherein the draft survey apparatus is determining the draft of a loaded barge.

With further reference to FIG. 6, an exemplary barge 5 is depicted which is empty of or does not contain a bulk material load. The first draft 30a of the barge 5 can be determined by determining the height 32a of the barge 5 above the water level 7. The water level 7 may be an average of the data received for the height of the water surface 6. Now referring to FIG. 7, when bulk material 34 is added to the barge, the draft 30b of the barge 5 increases, and consequently the height 32b of the barge 5 above the water level 7 decrease. The draft survey apparatus 10 may be operable to determine the mass of the bulk materials 34 added to the cargo by determining the volume of water displaced. Thus the mass of the bulk materials is determined by the change in height 32 of the barge above the water line 7 from one moment to another. In some embodiments, the draft survey apparatus 10 may generate a 3D model of the barge 5 for determining the various calculations disclosed herein, including but not limited to the volume of the barge 5 and volume of the water displaced during the loading or discharging of bulk materials.

One of skill in the art would recognize that traditionally used information including density of water displaced, volume of the barge 5, etc. may be necessary for determining mass of bulk materials when gauging a barge 5. This information may be available in a database 17 operably coupled to the processor 16, wherein the processor 16 uses the information to accurately determine the mass of the bulk material loaded or unloaded from a barge 5.

In other embodiments, the draft survey apparatus 10 may be operable to provide a multipoint static or dynamic calculation of yaw, pitch, and roll of the barge 5. Because the draft survey apparatus 10 relies on photons 13 which travel the speed of light and processors 16, the data can be gathered and processed nearly instantaneously, thus allowing a user to receive real-time information and status for the measurements which were selected by the user.

In another embodiment, the draft survey apparatus 10 may be operable to utilize multiband beam detection. Multiband beam detection can permit the draft survey apparatus 10 to determine the draft or pitch, roll, and yaw of a barge 5, even for barges 5 of varying lengths and sizes.

In some embodiments, the draft survey apparatus 10 may utilize 3D Point-Cloud data and rigid-body kinematics to monitor bulk weight during the loading and unloading of bulk materials on a barge 5. The draft survey apparatus 10 may also monitor the waterline 7 for any changes which would impact the accuracy of the draft measurement.

Figure 8:
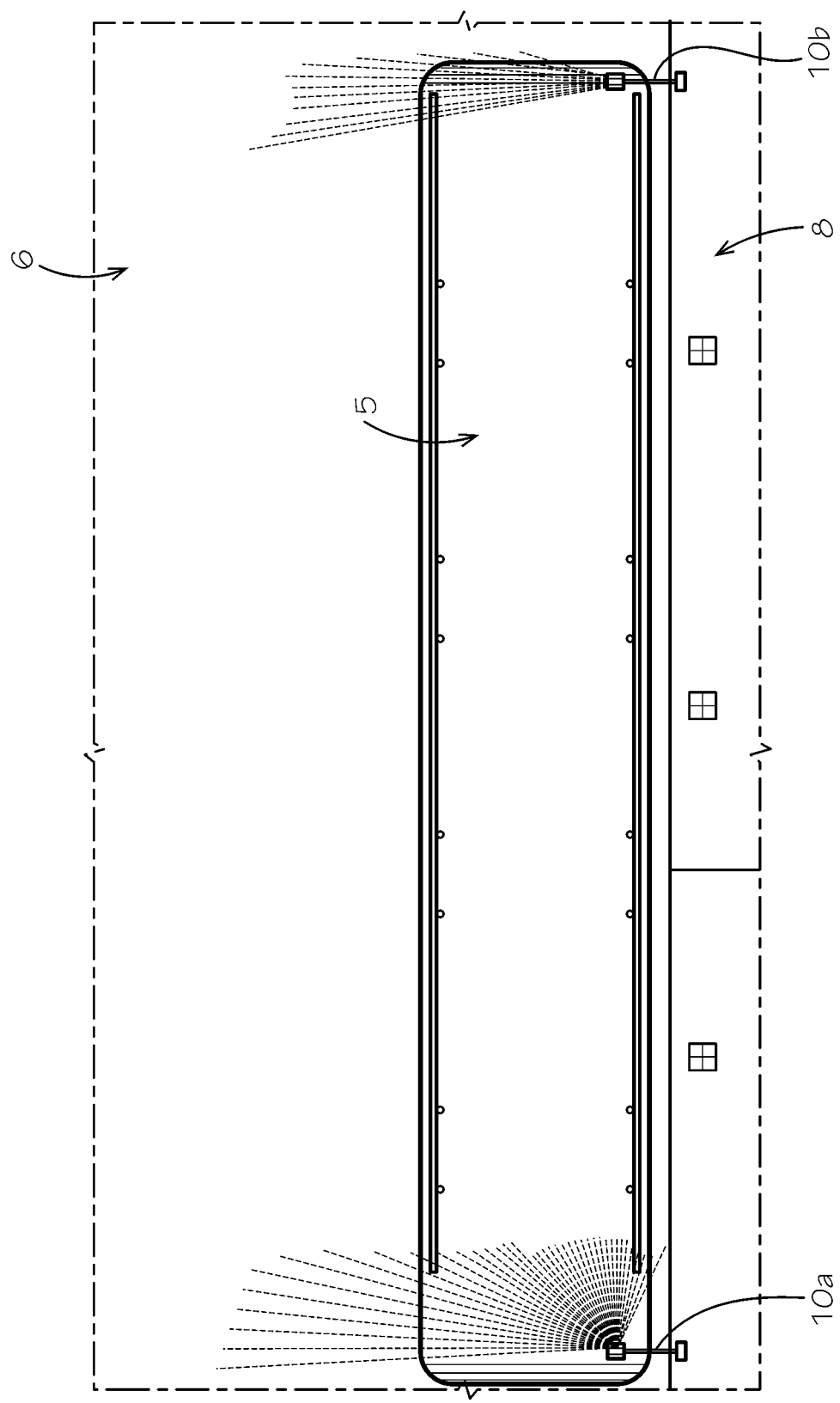
FIG. 8 is an exemplary embodiment of a draft survey system implementing two draft survey apparatuses.

Referring to FIG. 8, in some embodiment a system is provided in which two draft survey apparatuses 10 are used in conjunction with each other. This may be advantageous when a barge is unusually long and therefor difficult for a single draft survey apparatus 10 to accurately determine the draft of the barge. In these embodiments, the system may include a first draft survey apparatus 10a and a second draft survey apparatus 10b. Each of the draft survey apparatuses 10 may include at least one light source 12 and receiver 14. The data produced and collected from each of the draft survey apparatuses 10 may be sent to a central processor 16 for determining the overall draft of the barge 5.

Figure 9:
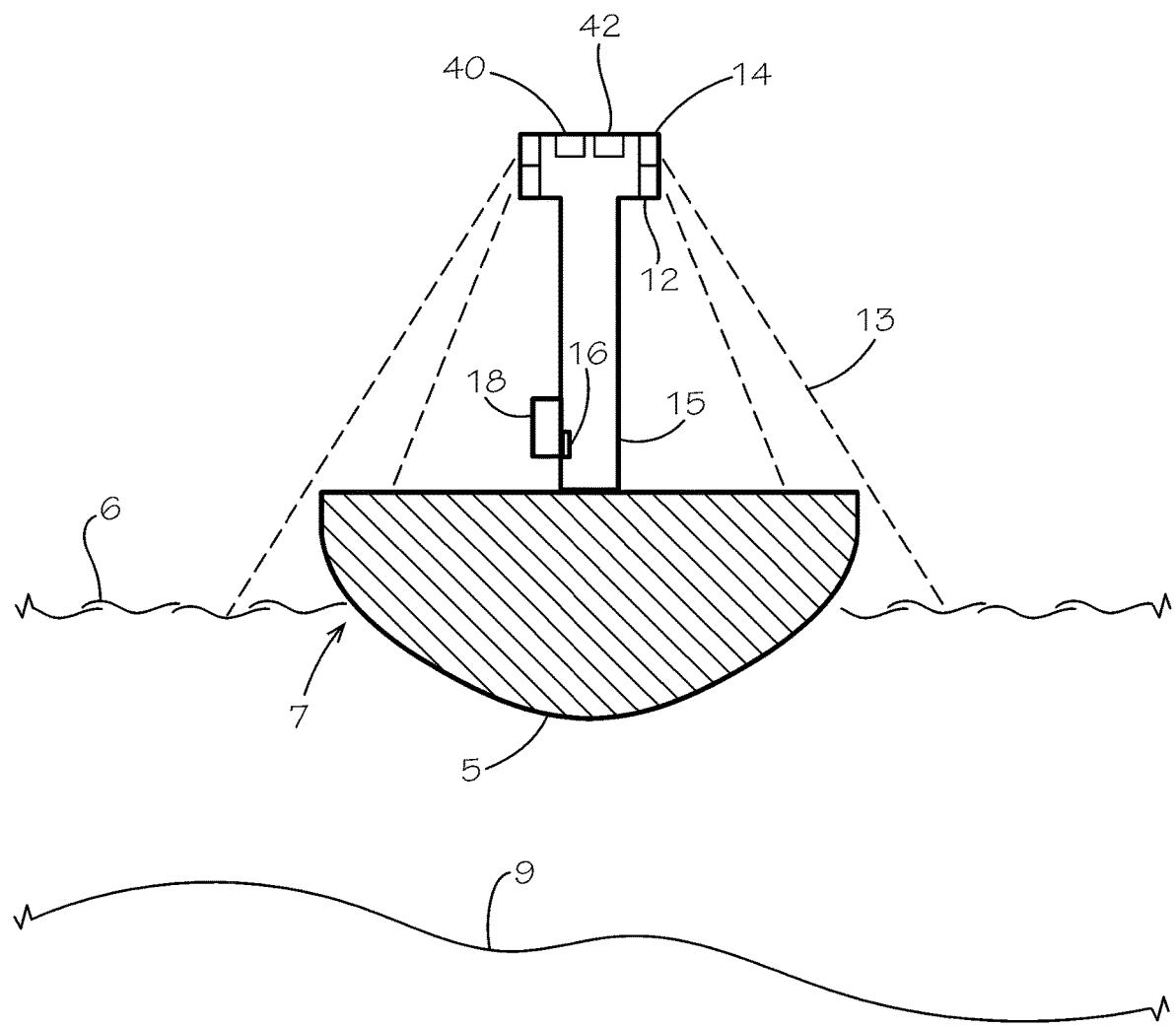
FIG. 9 is an exemplary embodiment of a draft survey apparatus mounted to a barge.

Now referring to FIG. 9, the draft survey apparatus 10 may be mounted on a barge 5, such as on a pole 15, or in embodiments not shown, the light source 12 and the receiver 14 may be mounted directly on the barge 5 proximate each other. When the light source 12 and the receiver 14 are mounted proximate each other, the photons 13 are emitted from the light source 12, travel radially outward from the light source 12, reflect off of a surface or an object, and are received by the receiver 14. The distance the photon 13 travelled may be determined by the time it takes the photon 13 to be received by the receiver 14 after it has been emitted from the light source 12. The longer the photon 13 takes to return to the receiver 14 after it has been emitted, the further the distance the photon 13 has travelled. Thus, the distance from the light source 12 to the surface or object and to the receiver may be determined.

When the draft survey apparatus 10 is mounted on the barge 5, the same principles apply to the determination of the draft of the barge 5. However, in some embodiments, when the draft survey apparatus 10 is mounted to the barge, in order to obtain more accurate measurements of the draft when the draft survey apparatus 10 is mounted on mobile or moving barge 5, the draft survey apparatus 10 may further comprise an accelerometer 40 and/or gyroscope 42. The accelerometer 40 and gyroscope 42 may be operable to provide the processor 16 with information relating to the movement of the barge 5 in the water in order to account for some of the pitch, yaw, and roll of the barge 5 that occurs in water, whether a material load is absent, present, or distributed evenly or unevenly.

In other embodiments, the draft survey apparatus 10 may further be operable to determine the topography of a bed 9 of a river or lake as well as the draft of the barge 5. The ability to determine the topography of the bed 9 allows a captain to safely navigate through waters, specifically shallow waters, with knowledge of the draft of the barge 5 relative to the depth of the water over the bed 9.

A method of determining the draft of a barge 5 or gauging a barge 5 is provided herein. The method includes emitting photons 13a from a light source 10; receiving reflected photons 13b by a receiver 14, wherein the reflected photons 13b are the photons 13 emitted from the light source 10 and reflected from surfaces including a barge surface and a water surface 6; providing to a processor 16 a first time at which the photons 13a were emitted from the light source 10; providing to the processor 16 a second time at which the reflected photons 13b were received by the receiver 14 and a receiving angle at which the receiver 14 received the reflected photons 13b; and determining, by the processor 16, a position of the barge surface relative to the water surface based on the first time, the second time, and the receiving angle.

In some embodiments, the method further incudes transmitting, by a transceiver from the processor 16 to a user interface 18, the position of the barge surface relative to the water surface; determining by the processor 16 a plurality of points on the barge surface, including Point A 22, Point B 24, Point C 26, and Point D 28; determining by the processor 16 a roll, pitch, and yaw of the barge based on the relative location of Point A 22, Point B 24, Point C 26, Point D 28, and the water surface 6; and sending a terminate instruction from the processor 16 to a bulk materials transporter when predefined conditions are met, wherein the predefined conditions include a predetermined change in roll, pitch, or yaw of the barge.

Thus, although there have been described particular embodiments of the present invention of a new and useful BARGE GAUGING WITH LIDAR, it is not intended that such references be construed as limitations upon the scope of this invention.

What is claimed is:

1. A draft survey apparatus for gauging a barge by determining a weight of bulk materials loaded and discharged from the barge in water wherein a water level is where a surface of the water meets the barge, comprising:
   a light source for emitting photons radially outward from the light source;
   a receiver for receiving the photons reflected off of the barge and the surface of the water, the receiver operable to determine a return angle of the photons; and
   a processor operable to receive data from the light source and the receiver and to calculate, based on the received data, a first position of the barge and a second position of the surface of the water in three dimensional space based on the return angle of the photons and a time delay of the photons between emission and receipt, wherein the processor is operable to determine the weight of the bulk materials on the barge based on the data received from the light source and the receiver.

2. The draft survey apparatus of claim 1, further comprising a pole having a first end and a second end, wherein the light source and the receiver are mounted to the first end of the pole.

3. The draft survey apparatus of claim 1, further comprising a user interface operable to receive instructions to display the weight of the bulk materials loaded on and discharged from the barge.

4. The draft survey apparatus of claim 1, wherein the light source during operation regularly emits photons and the processor during operation continuously determines the weight of bulk materials loaded on and discharged from the barge.

5. The draft survey apparatus of claim 1, wherein the processor is operable to determine the first position of the barge by determining a location of a plurality of points along the barge.

6. The draft survey apparatus of claim 5, wherein the plurality of points includes Point A, Point B, Point C, and Point D.

7. The draft survey apparatus of claim 6, wherein the processor dynamically determines a roll, a pitch, and a yaw of the barge as bulk materials are loaded on and discharged from the barge based on dynamic calculation of the location of Point A, Point B, Point C, and Point D relative to the surface of the water.

8. A draft survey system for determining a draft of a barge as bulk materials are loaded on and discharged from the barge, comprising:
a first draft survey apparatus including a first light source for emitting photons radially outward from the first light source and a first receiver for receiving the photons reflected off surfaces including a barge surface and a water surface, the first receiver operable to sense a return angle of the photons;
a second draft survey apparatus including a second light source for emitting photons radially outward from the second light source and a second receiver for receiving the photons reflected off the barge surface and the water surface, the second receiver operable to sense a return angle of the photons;
a processor operable to receive data from the first light source, the second light source, the first receiver, and the second receiver and to calculate, based on the received data, a first position of the barge surface and a second position of the water surface in three dimensional space based on the return angle of the photons and a time delay of the photons between emission and receipt; and
a user interface operable to display the first position of the barge surface and the second position of the water surface.

9. The draft survey system of claim 8, wherein the processor is further operable to continuously determine during operation the draft of the barge as the bulk materials are loaded on and discharged from the barge by regularly determining the first position of the barge surface relative to the second position of the water surface.

10. The draft survey system of claim 9, further comprising a bulk materials transporter for loading and discharging bulk materials from the barge, wherein the processor is operable to send an instruction to terminate operation of the bulk materials transporter based on predefined draft parameters.

11. The draft survey system of claim 8, further comprising a transceiver coupled to the processor for receiving and transmitting data.

12. The draft survey system of claim 11, wherein the processor is operable to send and receive instructions to and from the user interface via the transceiver.

13. The draft survey system of claim 8, further comprising:
a first pole with a first and second end, wherein the first light source and the first receiver are mounted to the first pole; and
a second pole, wherein the second light source and the second receiver are mounted to the second pole, wherein the first pole and the second pole are spaced from each other.

14. The draft survey system of claim 13, further comprising:
a third light source mounted to the first end of the first pole; and
a third receiver mounted to the first end of the first pole, wherein the third light source and the third receiver are operable to send and receive data from the processor.

15. A method of determining a draft of a barge, comprising:
emitting photons from a light source;
receiving reflected photons by a receiver, wherein the reflected photons are the photons emitted from the light source and reflected from surfaces including a barge surface and a water surface;
providing to a processor a first time at which the photons were emitted from the light source;
providing to the processor a second time at which the reflected photons were received by the receiver;
providing to the processor a receiving angle at which the receiver received the reflected photons; and
determining, by the processor, a position of the barge surface relative to the water surface based on the first time, the second time, and the receiving angle.

16. The method of claim 15, further comprising transmitting, by a transceiver from the processor to a user interface, the position of the barge surface relative to the water surface.

17. The method of claim 16, further comprising determining by the processor a plurality of points on the barge surface, including Point A, Point B, Point C, and Point D.

18. The method of claim 17, further comprising determining by the processor a roll, pitch, and yaw of the barge based on the relative location of Point A, Point B, Point C, Point D, and the water surface.

19. The method of claim 18, further comprising sending a terminate instruction from the processor to a bulk materials transporter when predefined conditions are met.

20. The method of claim 19, wherein the predefined conditions include a predetermined change in roll, pitch, or yaw of the barge.

* * * * *